(No Model.)

J. C. BAYLES.
PIPE OR TUBE.

No. 406,332. Patented July 2, 1889.

Witnesses:
Raphaël Netter
Robt. F. Gaylord

Jas. C. Bayles, Inventor
by Duncan Curtis & Page
Attorneys.

UNITED STATES PATENT OFFICE.

JAMES C. BAYLES, OF NEW YORK, N. Y.

PIPE OR TUBE.

SPECIFICATION forming part of Letters Patent No. 406,332, dated July 2, 1889.

Application filed April 6, 1889. Serial No. 306,167. (No model.)

*To all whom it may concern:*

Be it known that I, JAMES C. BAYLES, of the city, county, and State of New York, have invented certain new and useful Improvements in Pipes or Tubes, of which the following is a full, clear, and exact description, reference being had to the accompanying drawings.

The present invention relates to the construction of pipes or tubes, and especially to that class of pipes that are adapted to conducting acidulous or other iron-destroying liquids. Thus in mining and similar operations it is found that much of the water that it is necessary to drain or draw off is more or less impregnated with sulphur or other elements that render it corrosive in its action upon metal pipes which usually are made of iron.

Heretofore it has been customary to a limited extent to use pipes made of wood or similarly non-corrosive material; but this kind of pipe is obviously impracticable in various respects. It is difficult to make, as well as expensive, especially in large sizes and in regions where there is little timber. It is cumbersome to handle and does not well serve where a water-tight pipe is needed.

It is therefore the object of the invention to produce a metal pipe which shall be capable of resisting the action of the iron-destroying fluids; and the invention consists of a pipe made up from sheet-iron and provided with a lining or sheathing of lead.

Figure 1:
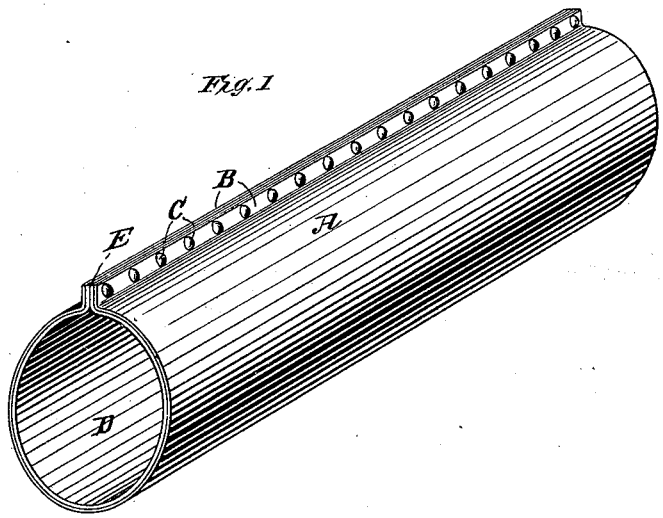

Referring to the drawings, Figure 1 shows a section of pipe embodying the invention and having but one seam. Figs. 2 to 5 are cross-sections of modified forms.

Refering to these views in detail, A represents the exterior or body part of the pipe. This body is composed of sheet-metal blanks, which is brought into cylindrical form by any suitable means, with outwardly-projecting flanges B along its longitudinal edges. These flanges are brought opposite each other and then secured together by the rivets C, or any other suitable form of connection—that is to say, bolts or screws may be used, or even any form of suitable clamp—and in the case of very thin metal the flanges may be made to clasp each other or lock together.

D is a lining of lead, which extends over the entire inner surface of the metal body A. This lead lining will usually be of a thin gage, and before the seam parts of the iron body of the pipe are closed finally together the sheet of lead will be inserted in such body and worked down to conform to substantially the same form—that is, so as to lie closely on the inner surface of the sheet-iron. Of course the sheet-lead may be shaped with the body of the pipe when this is practicable, and still other ways of placing the lining within the body of the pipe and conforming it thereto will occur to those familiar with the art of pipe-making. This lead sheathing is to be flanged similarly to the blank of the body part, and the flanges E thus formed are to be brought together face to face and secured to and between the flanges B of the iron body. Thus the seam of the pipe as a whole consists of four thicknesses and forms a rib or wing extending outwardly from the surface of the pipe, which serves to stiffen and strengthen the pipe and exposes the junctional parts of the seam for easy manipulation in case of repair of leaks or ruptures.

It is essential in the construction of this pipe that the interior sheathing be secured between the flanges of the iron body. Not only is a tight seam readily formed, but the lining is held against collapsing or being forced away from the surface of the iron. Thus, as is well understood, the lead lining under the action of heat will expand and stretch, but it will not when subsequently cooled contract and return to its previous form, and the effects of long-continued expansion and contraction of the iron body of the pipe will tend to corrugate the lining and to force it away from contact with the inner face of the pipe, as well as to rupture it or cause it to collapse; but when the lining is attached to the body of the pipe the distortion of the lead lining is practically obviated, for the lining will be held against moving away from the iron. Where pipe of but a single seam is used, the pipe should be laid with the seam uppermost, so that the lining will be positively held up by the iron body, and not alone by virtue of the strength of its own arch, for then the action of contraction and expansion, which would be most exerted in the arch, will have no serious or detrimental effect.

Figure 2:
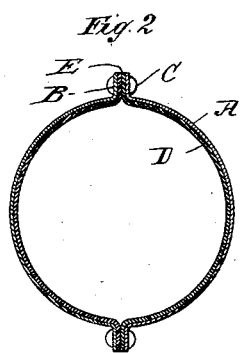
Figure 3:
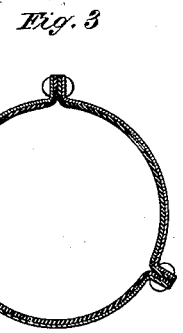

Fig. 2 shows a form of pipe having two seams, but in other respects it is the same as the pipe of Fig. 1. Fig. 3 is another similar form of pipe composed of three sections and having three seams.

It is expected that the most available form of pipe would be one having two or more seams, as the sections of such a pipe may be most conveniently bunched and shipped from the factory to the place of use, where the sections may be secured together in pipe form. So, too, with such pipe, the separate sections are so nearly flat that it is a simple matter to apply the lead linings to them, which may very readily be done at the time of assembling them into pipe form. The lead in thin sheets would have but to be laid in the sections and could be quickly shaped thereto by mallets or other simple hand-tools, and in case the run of water does not fill the pipe, or does so rarely, then only the lower or underneath section or sections need be lined.

Figure 4:
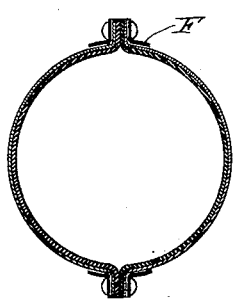

In Fig. 4 I show the seams provided with re-enforce pieces F, which are angle-bars lying in the angles of the seams, and are employed where a strong pipe is needed and the rigidity and strength of the seam parts is a matter of importance. These re-enforce bars may be of any other suitable form, or they may be of a single piece instead of separate strips located upon opposite sides of the seam and adapted to inclose the seam parts.

Figure 5:
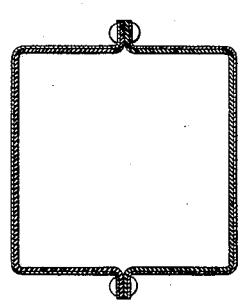

Fig. 5 shows one form of flat-sided pipe, this particular form being square and having a seam along the middle line of its two opposite sides.

The invention may be embodied in yet other forms of pipe; but it is believed those shown serve to illustrate the principle of the invention and its application.

Although I have described this pipe as applied to the drainage of mines and similar works, it will be obvious that its utility is not limited thereto, and that it is applicable to the conduction of any kind of liquids and under any circumstances where such pipe would be effective.

What I claim as new is—

1. A pipe composed of a sheet-iron section shaped into cylindrical form with outwardly-projecting flanges along its opposite longitudinal edges, and a sheet-lead section similarly shaped and arranged within the sheet-iron section, with its flanges brought together face to face and secured to and between the flanges of the iron section.

2. A pipe composed of two or more sheet-iron sections, each shaped into the partial form of the pipe, with outwardly-projecting flanges at their longitudinal edges and provided with a sheet-lead lining, the sections being arranged in pipe form and their flanges secured together.

3. A pipe composed of sections of sheet-iron shaped longitudinally into pipe form and secured together along their longitudinal edges, and having a sheet-lead lining which is secured to the iron sections at their seams.

JAMES C. BAYLES.

Witnesses:
FRANK E. HARTLEY,
ERNEST HOPKINSON.